Figure 1:
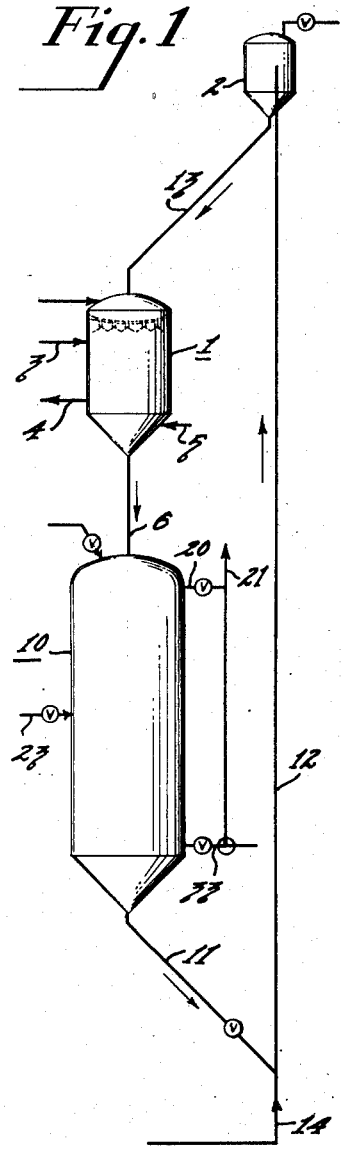

July 24, 1951

C. C. PEAVY 2,561,408

CATALYST REGENERATION

Filed May 25, 1948

2 Sheets-Sheet 1

INVENTOR
Claude C. Peavy
BY
Gordon A. Kessler
ATTORNEY

July 24, 1951

C. C. PEAVY 2,561,408

CATALYST REGENERATION

Filed May 25, 1948

2 Sheets-Sheet 2

INVENTOR
Claude C. Peavy
BY
Gordon A. Kesler
ATTORNEY

Patented July 24, 1951

2,561,408

UNITED STATES PATENT OFFICE 2,561,408

CATALYST REGENERATION

Claude C. Peavy, Philadelphia, Pa., assignor to Houdry Process Corporation, Wilmington, Del., a corporation of Delaware Application May 25, 1948, Serial No. 28,979

15 Claims. (Cl. 196—52)

The present invention is directed to improvements in methods and systems for reactivation and regeneration of solid contact masses containing combustible deposit therein. It is particularly concerned with the construction and operation of regeneration kilns of the type wherein a moving body of contact mass containing carbonaceous deposit, such as used catalyst from a hydrocarbon conversion step, is brought into contact with an oxidizing or combustion-supporting gas to effect burning of such deposit.

Processes for catalytic cracking of hydrocarbon oils are well known and in extensive commercial use. In typical processes, a hydrocarbon fraction, such as a gas oil, is brought into contact in vapor form and at temperatures of about 800° F. or above with a particle form solid contact mass having catalytic activity, thereby effecting conversion of a substantial part of the hydrocarbons to gasoline. In common use as catalysts for the purpose are natural and synthetic siliceous adsorptive masses, such as chiefly acid-activated clays and dried gels comprising silica and alumina. Similar systems and arrangements are often used in the treatment of gasoline and naphtha fractions to obtain improvements in the quality thereof such as upgrading of the octane rating; these treatments are commonly referred to as "catalytic treating" or "reforming."

A widely used system for carrying out such reactions involves an arrangement wherein the particle form solid contact mass is moved cyclically through two separate zones, in the first of which the desired hydrocarbon conversion reactions are carried out, and in the other zone the used contact mass from such reactions is regenerated by contact with air or other oxygen-containing gas effecting burning of the combustible deposit, called "coke," formed in such mass during the hydrocarbon conversion reactions. The regenerated contact mass is then returned to the first zone for further use therein. The present invention is concerned chiefly with the operation of the regeneration zone in such systems; however, since a cycle of operations including alternate periods of hydrocarbon conversion and regeneration is involved in these systems, changes brought about in the regeneration conditions have important influences on the conditions of the hydrocarbon conversion process, while the operation of the latter in turn, particularly with respect to quantity of "coke" laid down therein, imposes operating limitations which must be considered in the design and operation of the regeneration zone.

The regeneration of a catalytic contact mass by burning of the combustible carbonaceous and hydrocarbonaceous deposit therein involves essentially exothermic reactions which raise the temperature of the mass. Initial combustion of the deposit takes place at temperatures of about 750–800° F. and with continued burning the amount of heat liberated causes increase in the temperature of the mass such that, unless suitable controls are provided, temperatures are reached which may result in permanent injury to the mass. For instance, it has been observed that active clay cracking catalysts may be impaired when regeneration temperatures are permitted to exceed about 1100–1150° F. or so for any length of time in the presence of quantities of steam released from burning of the hydrocarbonaceous deposit; synthetic catalysts ordinarily can withstand higher temperatures. To avoid excessive and injurious temperatures, it has been the practice to provide for heat removal from the regeneration zone, as by the provision of cooling means substantially throughout the regeneration zone or by alternate stages of cooling and combustion. To maintain practical operating efficiency, the temperature rise in each stage of a multi-stage regeneration system is likewise limited, so that a fairly large number of combustion and cooling stages is required. A multiplicity of stages in a regenerating kiln not only increases equipment and maintenance costs but also adds materially to the complexity of control and operation to the extent of the number of such stages. In kiln structures wherein substantial or extensive cooling by indirect heat transfer is provided within the kiln proper, a large part of the kiln volume is devoted to the cooling equipment, thereby reducing the catalyst handling capacity per unit volume of the kiln. In such multi-stage regeneration systems, too, only part of the actual catalyst capacity of the kiln is employed for unhindered combustion of the carbonaceous deposit, since combustion of coke is materially retarded during a considerable part of the total regeneration period when the catalyst comes in contact with cooling coils.

In accordance with the present invention, efficient regeneration is obtained with important savings in operation and maintenance costs in addition to considerable economies in equipment construction costs, as a result of simplification of the kiln structure and operation. The efficient use of such simplified kiln design is made possible by the application of novel regeneration techniques together with the provision of suitable controls in the operation of the hydrocarbon conversion and regeneration cycle. The novel regeneration method of the invention involves an arrangement whereby relatively cold oxygen-containing gas such as air is admitted to an intermediate section of the kiln and the stream of gas is split to flow in opposite directions through relatively deep compact beds of moving contact mass in the upper and lower portions of the kiln, the formed gaseous combustion products being separately discharged.

Additional important advantages of the invention are realized in the operation of hydrocarbon conversion systems circulating catalyst at high rates such as in hydrocarbon conversion processes, including cracking, utilizing high catalyst-to-oil throughput ratios in the reactor. By catalyst-to-oil ratio is meant the ratio of the weight of catalyst introduced into a hydrocarbon conversion reactor per unit weight of oil charged thereto in the same time.

Figure 2:
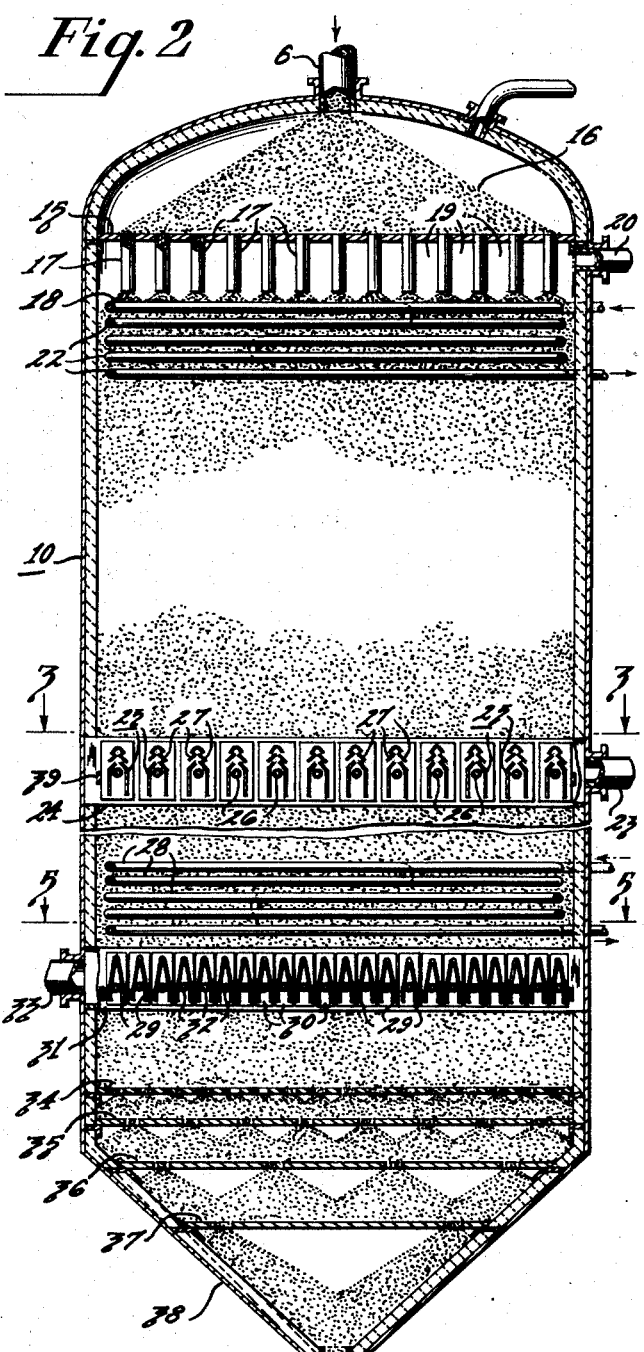
Figure 3:
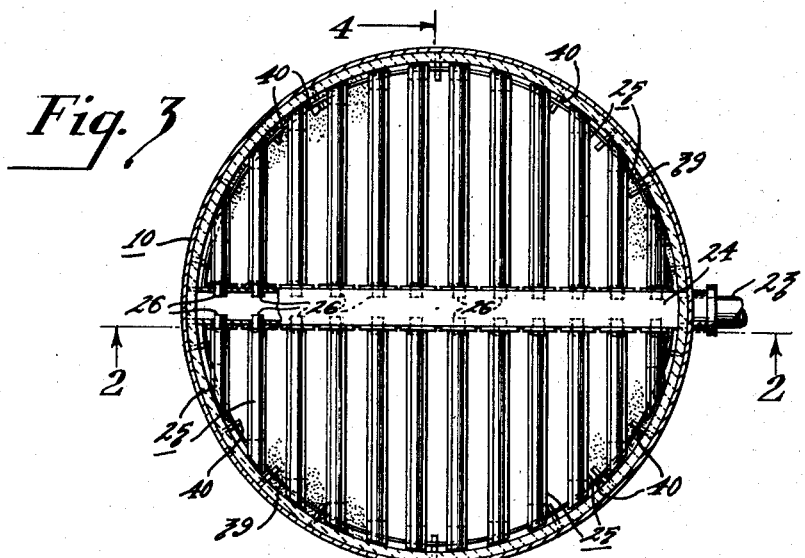
Figure 4:
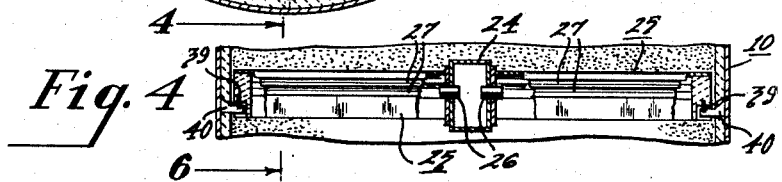
Figure 5:
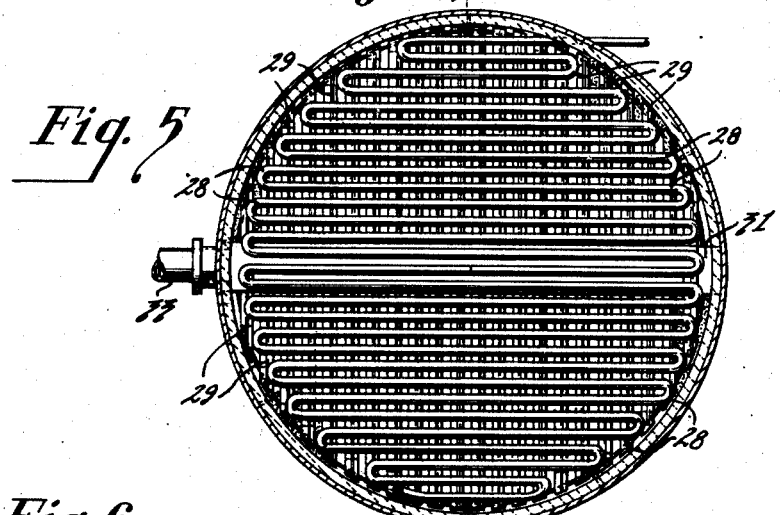
Figure 6:
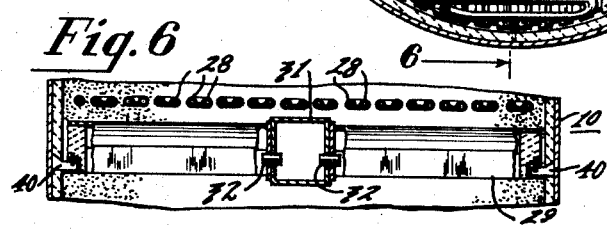

The invention will be fully understood and other important advantages appreciated from the detailed description which follows, read in connection with the accompanying drawings illustrating one form of apparatus suitable for the purpose. In these drawings, Figure 1 is a diagrammatic flow chart illustrating an arrangement that may be employed in practice of the invention; Figure 2 is a longitudinal cross-section of a novel kiln design in accordance with the invention; Figure 3 is a transverse section taken on line 3—3 of Figure 2; Figure 4 is a partial longitudinal section taken on line 4—4 of Figure 3; Figure 5 is a transverse section taken on line 5—5 of Figure 2; and Figure 6 is a partial longitudinal section taken on line 6—6 of Figure 5.

Referring now particularly to Figure 1, the novel kiln is diagrammatically represented in its relation to a typical cyclic system for carrying out a catalytic hydrocarbon conversion reaction such as cracking of a petroleum stock. The hydrocarbon conversion proper is effected in a reactor represented at 1 into which solid catalyst is continuously fed by gravity from a supply hopper 2 located above the reactor. The hydrocarbons to be cracked or otherwise catalytically reacted are brought into the reactor and are contacted with the catalyst passing downwardly through the reactor by flowing the hydrocarbons counter-currently with the catalyst or concurrently thereto. In the illustrated embodiment concurrent flow is shown; the hydrocarbons enter through a supply line 3 and the unreacted hydrocarbons and cracked products are removed through a discharge line 4, suitable means being provided to assist disengagement of vapors from the catalyst. The catalyst separated from hydrocarbon vapors is discharged from the reactor, first passing through a purging zone, below the level at which vapors are discharged through line 4; purge gas, such as steam or flue gas, is admitted to the zone by a suitable line as is illustrated at 5.

The spent catalyst discharged from the reactor is then passed to a kiln for regeneration. When the reactor is located above the kiln, catalyst may be passed from the reactor to the kiln by means of a connecting conduit as illustrated at 6 through which the catalyst flows by gravity. In other typical arangements wherein the reactor and kiln are located side by side, positive conveying means are provided for transportation of catalyst from the bottom of the reactor to the top of the kiln, which conveying means may be in the form of a mechanical elevator, conveniently of the bucket type, or some form of pneumatic lift.

In the kiln 10, catalyst is contacted with a flowing stream of oxygen-containing gas effecting combustion of the carbonaceous deposit in the catalyst, and the regenerated catalyst is discharged from the kiln, and is then brought by suitable means to the top of the reactor for repetition of the operations. Thus, as illustrated in Figure 1, catalyst may be discharged through a line 11 into a suitable conveyor 12 and thereby transported to the catalyst supply hopper 2 communicating with the reactor through a conduit 13, suitable provision being made to seal the conduit and hopper against the admission of gases from the reactor 1. Here again the transportation of catalyst from the bottom of the kiln to the reactor supply hopper may be accomplished by gravity in installations where the kiln is located above the reactor hopper, or in other instances by means of suitable positive conveying means in the form of a mechanical elevator or pneumatic lift. In the illustrated embodiment, for instance the catalyst is discharged through conduit 11 into a suitable gas stream directed as represented at 14 into pneumatic lift 12. In the hopper 2 the lift gas is disengaged from the catalyst, the catalyst settling in the bottom of the hopper and being discharged therefrom through the conduit 13.

Coming now to the novel kiln design and operation which may be employed with any of the arrangements of reactor and kiln set out above and with any suitable form of conveying and transporting means for cycling the catalyst in the described series of operations. Details of the kiln are illustrated in Figures 2 to 6. Below the top of the kiln and extending over the entire lateral cross-section thereof, a distributor plate is provided as shown at 15, on which the catalyst introduced through the conduit 6 is temporarily supported, the catalyst assuming a normal angle of repose as shown by the catalyst level indicated at 16. Depending from the distributor plate 15 there are shown a number of downcomer tubes 17 spaced over the entire area of the plate so as to obtain substantially uniform distribution of the catalyst over the transverse area of the kiln. By such arrangement, moreover, there is provided between the upper level of the catalyst bed 18 formed below the discharge outlet of downcomers 17 and between the catalyst level 18 and the bottom of the plate 15 a vapor disengaging space 19. This space 19 is in communication with a flue gas discharge outlet connected to a duct 20 through which the discharged gases are brought to a flue gas discharge line as illustrated at 21 (Figure 1). The flue gases thus discharged may be sent to waste or recycled for beneficial use in other parts of the system.

The catalyst descending in the kiln below the discharge outlets of the downcomers tubes 17 passes through a cooling zone located a short distance below the upper level 18 of the catalyst bed. Cooling in this zone is effected by indirect heat exchange, as illustrated by the provision of banks of cooling coils 22 through which water or other suitable heat exchange fluid is circulated.

Through a comparatively long path, as will be hereinafter explained, the bed of catalyst continues an uninterrupted descent below the indirect cooling zone until it reaches the air inlet zone located at an intermediate position between the described indirect cooling zone and the bottom of the kiln. Admission of air into the kiln is effected through one or more ducts 23 communicating with a single supply manifold 24 extend across the diameter of the kiln.

Branching transversely from the supply manifold 24 are shown a number of spaced channel members or inverted troughs 25 communicating with the manifold by means of inter-connecting nipples 26. The channel members are louvered as illustrated at 27. In this manner air introduced through a duct 23 and manifold 24 is distributed uniformly over the cross-sectional area of the kiln passing through the nipples 26 into the channel members 25 and is disseminated therefrom through the louvered openings 27.

Below the air inlet zone the catalyst continues its uninterrupted descent as a compact bed through the kiln and passes through a second indirect cooling zone provided with cooling coils 28 which may be similar in construction and operation to the coils 22 hereinbefore described. A short distance below the second cooling zone the descending catalyst passes through a disengaging zone wherein flue gases are withdrawn and discharged from the kiln. The disengaging zone is provided with channel members 29 substantially uniformly spaced over the entire cross-section of the kiln. These channel members 29 are also in the form of inverted troughs open at the bottom as shown at 30 for the admission of gases and vapors to the interior thereof. The channel members 29 are in communication with a discharge manifold 31 by means of connecting nipples 32, whereby the separated flue gas entering the channels is brought into the discharge manifold and discharged from the kiln by means of a duct 33. The duct 33 may be connected to the flue gas discharge line 21 or a separate discharge line may be provided so that the gases discharged through ducts 20 and 33 may be separately recycled to any desired location in the system.

Below the disengaging zone the kiln is converged, uniformly reducing in cross-section and forming thereby a funnel section for smooth passage of catalyst into discharge conduit 11. Uniform withdrawal of the regenerated catalyst from the wide bed and through the funnel section of the kiln is effected by means of a series of perforated plates. In the illustrated embodiment four such plates are shown at 34, 35, 36 and 37. It will be seen that the spacing of the perforations in the plates is such that the number of respective perforations in each successive plate is decreased. One or more of the plates being located at a position in the bottom of the kiln wherein the sides of the kiln are converged as illustrated at 38, such plates will also be of reduced diameter conforming to the diameter of the kiln at such location. Below the lowermost plate the catalyst is discharged into the conduit 11 to be recycled in the system as has already been described.

For purposes of simplifying the illustration, the supporting structures for the cooling coils have been omitted, these forming no part of the present invention. It will be understood, of course, that suitable means will be provided to obtain rigidity of construction. One means of supporting the external ends of the channel members 25 is illustrated in Figures 3 and 4 in the form of a ring bar 39 threaded through or attached to the ends of the channel members, the ring bar being anchored to the kiln wall by suitable hangers as illustrated at 40. The channel members 29 may be supported in like manner.

The described novel kiln arrangement may be substituted for the usual types of kilns provided in systems employing compact downwardly moving beds of coarse granular or pelleted catalyst with certain economic advantages in equipment costs, operation and maintenance. The novel kiln design, however, finds its most important use, with added advantages, in systems operating at relatively high catalyst circulation rates such as in catalytic cracking process employing high catalyst-to-oil ratios in the reactor, as of the order of catalyst-to-oil ratios of 5 to 1 or higher, as up to 10 to 1 and even above. In such systems, it will be understood, although the same weight quantity of coke or more thereof may be required to be burned in the kiln in a given time as in operations employing low catalyst-to-oil ratios in the order of 3 to 1 or less, that with the increased catalyst-to-oil ratios this quantity of coke is distributed over a larger amount of catalyst so that the weight percent of coke on the catalyst is nevertheless lower. The full advantages of the present invention are realized when the system is operated under selected conditions such that the weight percent of coke deposited on the catalyst in the reactor and burned in the kiln is in the order of less than 1%, advantageously lower than 0.8% to as low as 0.4% by weight coke. With this quantity of coke deposited, the system can be efficiently balanced between the reaction and regeneration operations so that the sensible heat amassed by the catalyst during regeneration in the combustion of the coke is utilized for providing the heat required for bringing the hydrocarbon charge to desired reaction temperature and providing the necessary heat for maintaining the reaction at desired temperature during the cracking or other hydrocarbon conversion operation.

In the operation of the described kiln the catalyst containing its full complement of coke as discharged from the reactor enters the kiln at substantially the temperature at which it is discharged from the reactor. A portion of this coke, whether because of its composition or its location with respect to the catalyst surface, is more easily burned than remaining portions of the coke. The described kiln structure and operation is so designed that the initial combustion of this coke takes place at comparatively low temperature and in the presence of regenerating gas of low oxygen concentration. Accordingly, prior to initiating substantial burning of the coke therein, the catalyst is reduced in temperature by passing through the first cooling zone in direct heat exchange with the coils 22. Most of the oxygen contained in the regenerating gas introduced through duct 23 will have been consumed in passing upwardly through the catalyst bed. The location of the air inlet and the volume of gas introduced will be so arranged for most efficient operation that substantially the entire oxygen content of the gas flowing upwardly through the kiln is beneficially utilized, the flue gas discharged through duct 20 containing a minimum quantity of unconsumed oxygen, which may be as low as about 0.2% by volume thereof.

The catalyst continuing in its descent below the top cooling zone is subjected to progressively higher oxygen concentrations as it approaches the air inlet zone and the catalyst also progressively increases in temperature, reaching maximum regeneration temperature or somewhat short thereof just about the air inlet zone. On reaching this level the major portion of the coke content of the catalyst will have been consumed. In the air inlet zone the catalyst is immediately cooled by efficient and direct heat exchange with the relatively cool flowing air introduced through the duct 23 and channels 25. The air so introduced may be at atmospheric temperature, but will generally be above that temperature as discharged from the air compressor.

The pressure at the air inlet zone is maintained above that existing at the top of the kiln at the level of the discharge outlet 20 and is also above that prevailing at the bottom of the kiln in the region of the discharge outlet 33, so that the air introduced through inlet 23 flows in the kiln in two directions; upwardly counter current to descending catalyst and downwardly below the inlet zone concurrently with descending catalyst. Below the air inlet zone a high rate of combustion of the remaining coke is soon brought about because of the relatively high oxygen concentration there provided. Continuing its descent the catalyst again is increased progressively in temperature reaching maximum regeneration temperature just above the second cooling zone where the descending catalyst comes into contact with the cooling coils 28 in that zone.

The relative quantities of air flowing in the two directions in the kiln from the air inlet zone can be controlled by the relative location of the air inlet zone with respect to the upper and lower flue gas outlets and/or by the differences in pressure at the respective outlets. It is preferred in most designs to maintain the pressure drop between the air inlet and the upper flue gas outlet substantially equal to the pressure drop between the air inlet and the bottom flue gas outlet. To assure substantially complete regeneration or the desired extent of regeneration, it has been found desirable to provide an excess of oxygen in the lower combustion zone, so that unconsumed oxygen is discharged with the flue gas through the lower outlet 33, constituting generally about 3 to 5% by volume of the discharged flue gas but may in some instances be as high as 10% or more. This can be accomplished even with equal volumes of air flowing in the two directions and with the air inlet zone located some distance above midway of the length of the kiln, because more than half of the coke content of the catalyst, as up to about ⅔ thereof, can be easily removed in the upper combustion zone of the kiln above the air inlet level.

The described system and arrangement obtain a number of processing advantages from the standpoint of a well-balanced operation providing different temperatures at several levels in the kiln, which temperatures are uniquely appropriate for the nature of the reactions taking place at each of these levels. Moreover, these desired temperatures are supplied by the sensible heat contained in the catalyst, which heat content is usefully employed in the regeneration process itself. Separate external heating of the regenerating gas is obviated, with extensive saving in fuel costs, and the necessity for indirect cooling of the catalyst is minimized. For example, in a typical balanced operation according to the invention, the catalyst containing its full complement of coke enters the kiln at approximately the temperature of its discharge from the reactor, say at 950° F. In passing through the top cooling section of the kiln, the catalyst is cooled about 50° as to approximately 900° F. At this comparatively low temperature and the short contact time involved, the detrimental effect of steam is practically negligible; even though, at this level in the kiln the highest concentration of steam is encountered as a result of the comparatively easier combustion of the hydrocarbonaceous component of the coke. The steam formed is in contact with the catalyst for a relatively short time since such steam is discharged with the flue gas through discharge outlet 20.

As the catalyst descends in the kiln the temperature successively increases as combustion progresses, and the increased temperatures become available in substantially the order required to burn the remaining more difficultly removable coke deposit. At approximately the point the catalyst attains maximum desired regeneration temperature, which may be at or just short of 1150° F., the descending catalyst is immediately brought into contact with the cool air introduced through the inlet channels 25, which efficiently cools the catalyst by direct heat exchange some 75 to 100 degrees, say to 1050° to 1075°.

The low temperature prevailing at the uppermost portion of the kiln favors the production of $CO_2$ as opposed to CO and thereby overcomes the possible reverse effect of the reduced oxygen content of the regeneration gas at this level. Distillation of unburned hydrocarbonaceous materials is also disfavored, thereby further reducing the possibilities or extent of "after burning" of the flue gas and the injurious effects thereof. It will also be understood that the entering air in addition provides the maximum oxygen content where needed to maintain the desired high combustion rates and for better maintaining the continuity of combustion with minimum retardation while the catalyst is reduced in temperature in passing through the relatively cooler air inlet zone. These variations in temperature and oxygen concentration at the several levels in the upper portion of the kiln accordingly provide a distinct nicety of auto-balanced control, affording desired safeguards against detrimental effects on the catalyst and equipment, and without sacrifice of desired rapidity of regeneration at maximum temperatures as these safeguards are no longer required.

The cooled catalyst passing below the air inlet zone moves concurrently with the descending air which is then at its maximum oxygen content. As a result thereof combustion of the more difficultly removable carbonaceous deposit rapidly ensues and the temperature of the catalyst is again progressively raised some 75 to 100°, as to about 1150° F., just above the lower cooling coils. Since most of the hydrocarbonaceous component of the coke has already been burned off in the upper section of the kiln, these or higher combustion temperatures with consequent desired rapid regeneration rates can now be safely employed without detrimental effect on the catalyst.

In the above illustrated operation, the maximum regeneration temperature employed is about 1150°, which is well suited for clay as well as synthetic silica-alumina catalyst. For the latter particularly higher maximum temperatures may be conveniently employed, if desired, as up to about 1300° F.

In the illustrated embodiment of Figure 2, the kiln is shown as equipped with upper and lower indirect cooling sections. This arrangement is particularly designed and adapted for use in connection with an oil cracking system utilizing conditions and catalyst throughput rates in the reactor section such that the catalyst accumulates therein about 0.7 to 1.0% by weight coke. A typical operation depositing this percentage of coke with an ordinary cracking stock, such as an East Texas gas oil of 30-35° API gravity, involves the use of catalyst-to-oil ratios of about 5 and liquid space rates of about 5. Under these conditions it has been found advisable to cool the catalyst after the major part of the coke has been burned and prior to discharge of the catalyst, to adjust the temperature thereof so as to provide catalyst at the reactor inlet at desired temperature. Also, by cooling the entering catalyst at the upper end of the kiln prior to substantial combustion, burning of the coke initially takes place at reduced temperature, thus increasing the heat storage capacity available for heat adsorption during the main portion of the regeneration. At higher catalyst circulation rates, such as in catalytic conversion operations including cracking operations under still higher catalyst-to-oil ratios than set out above, either or both of the illustrated indirect cooling sections may be omitted. This is made possible by the fact that increased catalyst throughput rates at any given hydrocarbon conversion level result in a smaller coke deposit per unit weight of catalyst. With the catalyst entering the kiln containing substantially less than 0.7% by weight coke and going to catalyst-to-oil ratios which may obtain as low as 0.4% by weight of coke on the catalyst, the quantity of coke per fixed amount of catalyst thus presented for regeneration is reduced. With less coke to be burned from the given quantity of catalyst, less heat is evolved in the regeneration process, thereby decreasing or eliminating the necessity for indirect cooling of the catalyst. Deleterious steam which is formed during the initial regeneration stages being immediately removed, higher regeneration temperatures may then be safely employed, if desired.

In the illustrated embodiment of Figure 2, only a single set of flue gas disengagers is shown, that at the lower portion of the kiln. Because of the large surface of catalyst presented at the top of the bed at 18 and the space 19 provided between the catalyst level in the kiln and the distributing plate 15, the necessity for the provision of special disengaging devices at the upper portion of the kiln is eliminated.

The illustrated kiln structure of simplified design, comprising only a single set of air inlet channels and a single set of disengagers and at most no more than two indirect cooling sections, is possible for efficient use only if adequate depth of the bed of catalyst is provided through which the regeneration gas may be passed without obstruction. A bed of adequate depth is generally had when there is provided respectively above and below the inlet manifold an unobstructed layer of catalyst through which the regenerating gas is passed, at least equal in depth to the diameter of the catalyst bed. The transverse cross-section of the bed must be sufficient to handle the required volume of regenerating gas such as air introduced to burn the amount of coke involved without thereby necessitating gas flow velocities of high enough magnitude to cause lifting of the catalyst or significantly impeding the flow thereof.

The air inlet channels are preferably located at a position along the length of the catalyst bed such that substantially equal pressure is obtained at the top and bottom flue gas outlets. Some latitude is permissible with respect to such location as between points 1/3 to 2/3 the length of the kiln or between such points with respect to the depth of the catalyst bed between the top and bottom flue gas outlets. Equalization of pressure, or pressure difference, if desired, may be obtained by throttle control of the flue gas outlet lines; or the quantity of introduced regenerating gas flowing respectively upwardly and downwardly from the inlet may be proportioned by the respective differences in pressure drop occurring in the upper and lower portions of the catalyst bed. With the air inlet channel thus located and with equal pressure at the top and bottom of the bed such that the same amount of regenerating gas flows in both directions, no less than 1/2 and up to about 2/3 of the coke content of the catalyst will be burned off before the catalyst passes the air inlet channel in its descent through the kiln. With the substantially uniform distribution of the introduced air over the cross-section of the kiln obtained by the illustrated distribution of the air inlet channels, efficient regeneration can be accomplished without necessitating resort to gas velocities of sufficient magnitude to lift the descending catalyst present above the air inlet channels. For cylindrical catalyst pellets of 4 mm. diameter and length and having an apparent bulk density of about 40 to 45 lbs. per cu. ft., a linear air velocity of about 2 to 3 feet per second is satisfactory. The structure is particularly designed for use with catalyst particles having discrete sizes as above about 20 mesh and including the usual pelleted catalysts of about 2 and 4 mm. size.

In the illustrated embodiment a pneumatic lift is shown as the means for transporting catalyst discharged from the kiln to the reactor supply hopper. This form of transporting and lifting means is particularly adapted for handling the large quantities of catalyst required to be moved in systems operating at comparatively high catalyst-to-oil ratios. As operating fluid in such pneumatic lift there may be employed any gas which does not react with the catalyst such as air, flue gas or mixtures of these. It will be understood, however, that the novel kiln design described is not limited to use in systems employing pneumatic conveying means, since one or more mechanical elevators of adequate capacity may be substituted.

In addition to the important savings in equipment cost and in operation of the simplified kiln design heretofore pointed out and beside the operating advantages already referred to, it will be appreciated that the described operation and system enables regeneration as well as hydrocarbon conversion under well-balanced conditions, wherein the heat capacity of the catalyst is fully and beneficially utilized. The relatively light catalyst deposit is burned even during the initial stages of the regeneration under auto-controlled conditions. Under-cooling with consequent substantial retardation of the regeneration process is avoided because of postponement, after regeneration has once been substantially established, of any cooling of the catalyst until after burning has been well established, which cooling takes place efficiently by the direct heat exchange between the introduced cool air and the hot catalyst. Moreover, final combustion is effected advantageously at the highest attained regeneration temperature, which high temperature enables better removal of the comparatively more difficultly combustible remaining vestiges of the coke.

Obviously many modifications and variations of the present invention as hereinbefore set forth may be made without departing from the spirit and scope thereof and therefore only such limitations should be imposed as are indicated in the appended claims.

I claim as my invention:

1. Process of regenerating catalyst by burning of carbonaceous deposit therefrom in contact with oxygen-containing regenerating gas, which comprises continuously introducing hot coke-containing catalyst directly from a preceding hydrocarbon conversion reaction into the upper portion of a confined longitudinally extensive zone to form a compact downwardly moving bed therein, continuously discharging regenerated catalyst at the bottom of said confined zone for return to said hydrocarbon conversion reaction, introducing cool regenerating gas at a single inlet level between the top and bottom of said bed, said regenerating gas being introduced in quantity sufficient to effect combustion of substantially the entire quantity of coke in said catalyst from said preceding hydrocarbon conversion reaction distributing the gas so introduced substantially uniformly over the cross-section of the bed, flowing a portion of the introduced regenerating gas upwardly and counter-currently through the bed of catalyst above the gas inlet level and flowing the remainder of the gas downwardly and concurrently through the bed of catalyst below said level, separately discharging gas including vaporous combustion products formed in regeneration of the catalyst respectively above and below said gas inlet level, the bed of catalyst in said confined zone moving downwardly through an unobstructed path of considerable longitudinal extent above said gas inlet level and also through an unobstructed path of considerable longitudinal extent below said inlet level, the temperature of said cool regenerating gas as introduced being considerably below that of the catalyst at said gas inlet level so that substantial cooling of the catalyst is thereby effected by direct contact of said cool gas with said catalyst, thereby increasing the capacity of the catalyst for further heating and permitting unhindered combustion of coke from the catalyst at rapid rates above and below said gas inlet level while maintaining a maximum regeneration temperature below that detrimental to the catalyst.

2. In processes of hydrocarbon conversion wherein catalyst becomes contaminated with coke deposit during hydrocarbon conversion reaction, such contaminated catalyst is continuously removed to a separate regeneration zone for combustion of said deposit and then returned for further use in the hydrocarbon conversion reaction, and wherein hot freshly regenerated catalyst is contacted with a cooler charge of hydrocarbons to be converted in the hydrocarbon conversion zone, said catalyst and said hydrocarbon charge being continuously introduced into said conversion zone at rates giving a comparatively high catalyst-to-oil weight ratio of not less than 5 to 1 so that the coke formed as a by-product in said process is distributed over a comparatively large quantity of catalyst and catalyst is discharged from the hydrocarbon conversion zone as said catalyst accumulates an average of not more than 1% by weight of coke, the improved method of regenerating the contaminated catalyst by burning the coke therein and thereby storing in said catalyst a quantity of heat sufficient to provide heat for maintaining the temperature of said hydrocarbon conversion reaction as well as heat required to raise the cooler hydrocarbon charge to desired reaction temperature for the hydrocarbon conversion reaction when said catalyst is returned thereto, which comprises passing the coke contaminated catalyst through only a single regeneration zone and as a dense compact downwardly moving bed, introducing oxygen-containing regenerating gas in cold state and at a single level only in said regenerating zone intermediate the top and bottom of said bed, said bed of catalyst during its downward movement towards the gas inlet zone coming into contact successively with oxygen-containing gas of progressively higher oxygen concentration and said catalyst during such downward movement being heated by combustion of the coke therein to attain substantially maximum desired regeneration temperature immediately above said gas inlet zone, quickly cooling the downwardly moving catalyst when at said temperature by passing the same through said gas inlet zone in direct contact with the cold oxygen containing gas directly introduced in said inlet zone, passing a portion of the gas so introduced upwardly through the descending bed of catalyst to effect combustion of coke in said catalyst and discharging from a disengaging zone provided above the upper level of said catalyst bed combustion gases thereby formed, continuing the downward movement of the catalyst bed below the gas inlet zone in contact with a portion of the cold oxygen containing gas passed through said bed whereby the catalyst below said gas inlet zone is again rapidly raised in temperature by combustion of residual coke in said catalyst, disengaging gas from said catalyst below said gas inlet zone and discharging said catalyst from regeneration after disengagement of said gas and without further combustion of coke in said catalyst.

3. Process in accordance with claim 2, wherein the inlet zone for said cold oxygen-containing gas is so located with respect to the depth of the moving bed of catalyst therebelow that approximately maximum regenerating temperature is again attained just prior to disengagement of gas from such catalyst.

4. The process in accordance with claim 2, wherein the catalyst as discharged from the hydrocarbon conversion zone and containing its full complement of coke is initially subjected to regeneration under comparatively mild conditions of low temperature and in the presence of regeneration gas of low oxygen concentration, steam formed in such regeneration being rapidly removed to prevent detrimental contact of such steam with catalyst at high temperature.

5. The process in accordance with claim 2, wherein said cold oxygen-containing gas is introduced at a level in said downwardly moving bed of catalyst and the proportionate volume of said gas flowing upwardly is so regulated that substantially the entire oxygen content of such upwardly flowing gas is beneficially utilized in combustion of coke prior to discharge of the gas above the upper level of said catalyst bed.

6. The process in accordance with claim 2, wherein the downwardly moving bed of catalyst below said gas inlet zone and prior to disengagement of vapors therefrom is further cooled by indirect heat exchange when the catalyst has again attained substantially maximum desired regeneration temperature in its descent below said gas inlet zone.

7. The process in accordance with claim 2, wherein the depth of the bed of catalyst above said gas inlet zone is so correlated with the quantity of oxygen-containing gas passed upwardly therethrough that a major portion of the original coke content of the catalyst is consumed when said catalyst reaches said gas inlet zone.

8. The process in accordance with claim 2, wherein the introduced oxygen-containing gas is proportioned by the relative lower pressure maintained at the respective disengaging zones above and below said gas inlet zone.

9. The process in accordance with claim 8, wherein the relative quantities of oxygen-containing gas flowing upwardly and downwardly from said gas inlet zone is so controlled by the relative location of said zone with respect to the upper and lower gas disengaging zones, that a greater quantity of gas flows upwardly.

10. The process in accordance with claim 2, wherein the gas discharged from lower disengaging zone is of higher unconsumed oxygen content than that discharged from upper disengaging zone as a result of combustion of a major portion of the coke content of the catalyst above the gas inlet zone.

11. Process for regeneration of coke-contaminated catalyst at rapid rates and at auto-controlled temperature conditions appropriate for safeguarding against thermal deactivation of such catalyst during regeneration, which comprises introducing into a regeneration zone catalyst at approximately its temperature of discharge from a hydrocarbon conversion reaction and containing 0.4 to 0.8% by weight of freshly formed coke from said reaction, passing such coke-containing catalyst downwardly as a dense compact bed through a laterally confined regeneration system and discharging regenerated catalyst from such system, introducing cold oxygen-containing regenerating gas into said bed of catalyst at a single gas inlet level intermediate the point of introduction of contaminated catalyst and the point of discharge of regenerated catalyst, said gas being introduced in quantity sufficient to effect combustion of the entire quantity of coke in said contaminated catalyst that is removed therefrom during regeneration in said system dividing the gas so introduced so that a portion of said gas passes upwardly through the descending bed of catalyst and another portion of said gas passes downwardly with the descending catalyst below said inlet level, controlling oxygen concentration and regeneration temperatures during descent of the catalyst bed in accordance with content and composition of remaining unconsumed coke therein as follows: cooling the catalyst containing its full complement of coke to below its initial temperature of introduction into the regeneration system and before substantial combustion of the coke is initiated thereby increasing the capacity of the catalyst for being subsequently heated at high regeneration rates, subjecting the thus cooled catalyst during its descent to regenerating gas of successively increased oxygen concentration and simultaneously raising the temperature of the catalyst by combustion of coke therein during such descent to approximately maximum desired regeneration temperature, effecting rapid regeneration at high combustion rates at approximately said maximum temperature in the presence of about the highest oxygen concentration employed during the course of the entire regeneration process, whereby more than half of the original coke content of the catalyst is consumed, quickly cooling the catalyst when at such temperature by direct exchange in contact with the cold regenerating gas immediate said gas inlet level, the full oxygen concentration of the introduced gas being provided at said level enabling substantially unretarded combustion of coke but at lower temperature, rapidly burning the remaining more difficultly removable coke as the catalyst descends below said gas inlet while said catalyst is in contact with downwardly moving regenerating gas at approximately full oxygen concentration, as the catalyst further descends continuing combustion of residual coke therein under conditions such that as the temperature of the catalyst is successively raised the content of the oxygen in the gas contacted by the catalyst is lower whereby combustion is controlled over a comparatively long path of travel without necessitating intermediate cooling of the catalyst, regeneration under the last defined conditions being continued until the catalyst attains approximately the desired maximum regeneration temperature, thereafter cooling the catalyst by indirect heat exchange prior to discharge thereof from said regeneration system.

12. Process according to claim 11 wherein the catalyst containing its full complement of coke is initially cooled to lower the temperature thereof to a comparatively minor extent and the catalyst is thereafter raised in temperature to at least several times that extent during its descent before again being cooled.

13. Apparatus for regenerating catalyst comprising a kiln, means for continuously introducing catalyst to the upper portion of said kiln, means for withdrawing catalyst from the bottom of said kiln, means forming a gas disengaging zone in the upper portion of the kiln, separate means providing a gas disengaging zone in the lower portion of the kiln, separate external ducts communicating with said disengaging zones for discharging combustion gas from said kiln, a single regenerating gas distributing manifold system in said kiln, said manifold system being located intermediate said disengaging zones and constituting the sole means for admission of regenerating gas into said kiln, an external duct communicating with said manifold system for introduction of regenerating gas thereto, a multiplicity of spaced distributing channel members branching from said manifold and arranged for substantial uniform distribution of regenerating gas over the lateral cross-section of said kiln, said distributing manifold system being spaced from said upper disengaging zone and from said lower disengaging zone respectively at distances at least equal to the width of the kiln, an indirect heat exchange member located directly above said lower disengaging zone, said kiln being free from obstructions therein between said distributing manifold system and said heat exchange member thereby permitting uninterrupted passage of catalyst in said kiln through the distance between said distributing manifold system and said heat exchange member.

14. Apparatus according to claim 13 including an upper indirect heat exchange member spaced at a substantial distance above said gas distributing manifold system and below said upper disengaging zone, providing an unobstructed path for the passage of catalyst in said kiln through the distance between said upper heat exchange member and said gas distributing manifold system, said path being of a depth at least equal to the width of the kiln.

15. The process of regenerating catalyst by continuously introducing hot coked catalyst directly from a hydrocarbon conversion zone at the top of a laterally confined regeneration zone and continuously withdrawing regenerated catalyst from the bottom of said regeneration zone to form a compact continuous descending bed of catalyst in said regeneration zone, said regenerated catalyst being returned without further combustion to said hydrocarbon conversion zone, introducing relatively cold air at a single gas inlet level and at an intermediate height of the descending bed of catalyst, said air being introduced in quantity sufficient to effect combustion of all the coke burned from the catalyst during passage of the catalyst through the said regeneration zone, flowing one portion of the air thus introduced upwardly through a deep uninterrupted layer of the descending catalyst above said inlet level and another portion of the air downwardly through a deep uninterrupted layer of the descending catalyst below said level, the several defined layers of catalyst immediately above and below said gas inlet level and for the entire depth of each of said layers occupying the full cross-sectional area of the regeneration zone, and separately discharging the several flue gas products formed by the combustion of the coke above and below said gas inlet level.

CLAUDE C. PEAVY.

REFERENCES CITED

The following references are of record in the file of this patent:

UNITED STATES PATENTS

| Number | Name | Date |
| --- | --- | --- |
| 2,386,670 | Evans | Oct. 9, 1945 |
| 2,418,679 | Utterback | Apr. 8, 1947 |
| 2,458,109 | Simpson | Jan. 4, 1949 |
| 2,458,434 | Simpson | Jan. 4, 1949 |
| 2,458,435 | Simpson | Jan. 4, 1949 |